# 2,965,669

ACYLATION OF HYDROXY NITRILES

David W. McDonald, Texas City, Tex., assignor to Monsanto Chemical Company, St. Louis, Mo., a corporation of Delaware No Drawing. Filed Nov. 19, 1957, Ser. No. 697,336

4 Claims. (Cl. 260—465.4)

This invention relates to an improved process for the acylation of α-hydroxy nitriles.

The carboxylic acid esters of α-hydroxy nitriles are valuable intermediates in the synthesis of unsaturated nitriles. When subjected to pyrolysis, these esters give rise to unsaturated nitriles which are themselves required in the manufacture of numerous important synthetic products or which can be readily converted to compounds valuable in the production of pharmaceuticals, surface coatings, dyes, rubber chemicals, explosives, and the like. Acrylonitrile, for example, used in the production of synthetic rubber and important synthetic fibers, may be produced by the pyrolysis of α-acetoxypropionitrile, the acetic acid ester of α-hydroxypropionitrile or lactonitrile.

The reaction of α-hydroxy nitriles with organic carboxylic acids in the presence of an organic sulfonic acid catalyst and an entrainer for removing water from the sphere of the reaction under reflux temperature and pressure conditions to give azeotropic distillation of the particular entrainer used is known. The reaction is usually carried out by charging the reactants, with the carboxylic acid in molar excess, the catalyst, and the entrainer to a suitable reactor equipped with a reflux condenser and heating the mixture under reflux conditions until the reaction is complete as shown by the absence of water in the condensed entraining fluid. However, this process is not always as efficient as could be desired since large amounts of tar or residue are formed in the course of the reaction.

It has now been discovered that tar or residue formation can be minimized by the addition of a dehydrating or water-adsorbing agent, such as silica gel, to the reactor during the reaction cycle. According to the invention, substantially equimolar quantities of an α-hydroxy nitrile and an organic carboxylic acid are heated together in the presence of a solvent capable of forming an azeotrope with the water produced in the reaction, an organic sulfonic acid catalyst, and a quantity of silica gel under reflux temperature and pressure conditions to give azeotropic distillation of the solvent.

The invention is illustrated in the following examples which, however, are not be construed as limiting it in any manner except as it is limited in the attached claims.

Example I

One mole of α-hydroxypropionitrile (lactonitrile), 1.2 moles of acetic acid, 0.08 mole of benzenesulfonic acid, and 1.0 mole of p-xylene were charged to a suitable reactor and heated to reflux conditions at atmospheric pressure. The mixture was refluxed for one hour while a constant boiling mixture of p-xylene and water was taken overhead and condensed. The condensed material was allowed to settle, the lower water layer was removed, and the p-xylene entrainer was returned to the reaction zone. At the end of the reaction period, the solvent was stripped from the reaction mixture under vacuum and the remaining material was distilled at a pressure of 11 mm. of Hg absolute to recover the unreacted hydroxy nitrile and the product, α-acetoxypropionitrile. The fraction boiling above 85° C. at 11 mm. of Hg was weighed and that portion of it in excess of the amount of catalyst charged was classified as tar or residue. In this instance this fraction weighed 17.7 g. The ratio of the weight of the residue to the weight of α-hydroxypropionitrile charged was approximately 0.25.

Example II

The experiment of Example I was repeated using the same reactants in the same proportions and under the same conditions except that 50 g. of silica gel (28–200 mesh) was charged to the reactor prior to introduction of the reactants. The reaction mixture was filtered to remove the silica gel. The silica gel was washed with hot acetic acid and these washings were added to the filtrate. The whole filtrate was then treated in the manner of the reaction mixture in Example I to recover the products and isolate the tar. In this experiment, the amount of tar or residue isolated was reduced to 12.2 g. with the ratio of the weight of the residue to the weight of the α-hydroxypropionitrile formed being 0.17.

Thus, it will be seen that the presence of silica gel in the reaction vessel acts in some fashion to retard the formation of tar or residue. In the run of Example II, approximately 30% less tar was isolated than in the conventional run of Example I and the ratio of tar recovered to the α-hydroxypropionitrile fed was proportionately lower. This, of course, represents a significant increase in efficiency in the process since all such tar or residue formed means a loss of process materials to a waste product.

The amount of silica gel employed may be varied over a fairly wide range. Generally, an amount in the range from about 50 to about 100% by weight of the α-hydroxy nitrile being reacted may be employed. Preferably amounts from about 70 to about 80% by weight are used. Particle size of the silica gel is not a critical variable. Any of the commercially available materials in mesh sizes such as 3–8, 6–12, 6–16, 14–20, 28–200 and through 325, for example, may be used. However, material in the finer mesh sizes such as 28–200 is preferred for this liquid phase reaction.

In addition to the α-hydroxypropionitrile of the examples, other α-hydroxy nitriles having the formula

RR'C(OH)CN wherein R is a lower alkyl radical such as methyl, ethyl, propyl, etc., and R' is hydrogen or a lower alkyl radical, are suitable. Individual compounds falling within this class are, for example, α-hydroxybutyronitrile, acetone cyanohydrin, methyl ethyl ketone cyanohydrin, and the like.

Suitable acids for esterifying the OH radical of the cyanohydrin are such acids as acetic, propionic, benzoic, stearic and oxalic acid.

The reaction is promoted by the use of an organic sulfonic acid catalyst such as the benzenesulfonic acid illustrated or p-toluenesulfonic acid, 2-naphthalenesulfonic acid, 2,5-dimethylbenzenesulfonic acid, methanesulfonic acid and the like, with the aromatic sulfonic acids being preferred. Catalyst cencentration is generally maintained in the range from about 0.01 to about 0.2 mole per mole of the hydroxy nitrile and preferably in the range from about 0.05 to about 0.1 mole per mole of the nitrile. The lower levels of catalyst concentration favor lower tar formation.

Substantially equimolecular proportions of the nitrile and the acid are employed for best results. However, the acid may be used in excess as practiced in the prior art if desired.

A relatively inert material capable of forming an azeotrope with water, said azeotrope having a boiling point below the boiling point of either the esterifying acid or hydroxy nitrile, may be used to remove the water formed from the zone of the reaction. Suitable compounds for this purpose in addition to the p-xylene mentioned in the examples are benzene, toluene, o- and m- xylenes, cumene, n-propyl acetate, methyl n-propyl ketone, and the like.

While the examples show the use of one mole of solvent per mole of hydroxy nitrile charged, the process is not limited to these proportions. The amount of solvent employed may be varied over a wide range. Generally, from one to about 5 moles of solvent are used per mole of hydroxy nitrile charged. In fact, with certain other conditions controlled, the use of at least five moles of solvent is preferred since this proportion of solvent also seems to suppress tar or residue formation. More solvent may be used if desired, however, the maximum limits being imposed only by practical considerations.

The reaction temperature is dependent upon the particular hydroxy nitrile reacted and the entrainer employed. Generally, any temperature in the range from 80–150° C. is suitable. Temperature can also be a critical variable since tar or residue formation can be influenced by its control. Lower temperatures tend to prevent high tar or residue formation. Hence, the preferred temperature range is from 80–90° C. This range can be achieved by using low-boiling entrainers such as benzene or by conducting the reaction with the higher boiling entrainers under the reduced pressures required to secure the desired temperature.

What is claimed is:

1. In a process for producing esters of $\alpha$-hydroxynitriles which consists in reacting an $\alpha$-hydroxynitrile of the formula RR'C(OH)CN wherein R is a lower alkyl radical and R' is chosen from the group consisting of hydrogen and lower alkyl radicals with an organic carboxylic acid chosen from the group consisting of acetic, propionic, benzoic, stearic and oxalic acids in the presence of an aromatic sulfonic acid catalyst and in an entrainer under reflux conditions, said entrainer being selected from the group cosisting of benzene, lower alkyl-substituted benzenes, n-propyl acetate, and methyl n-propyl ketone, the improvement which comprises conducting the reaction in the presence of silica gel, the amount of silica gel employed being in the range from about 50% to about 100% by weight of the $\alpha$-hydroxy nitrile charged to the reaction.

2. In a process for producing esters of $\alpha$-hydroxynitriles which consists in reacting an $\alpha$-hydroxynitrile of the formula RR'C(OH)CN wherein R is a lower alkyl radical and R' is chosen from the group consisting of hydrogen and lower alkyl radicals with an organic carboxylic acid chosen from the group consisting of acetic, propionic, benzoic, stearic and oxalic acids in the presence of an aromatic sulfonic acid catalyst and in an entrainer under reflux conditions, said entrainer being selected from the group consisting of benzene, lower alkyl-substituted benzenes, n-propyl acetate, and methyl n-propyl ketone, the improvement which comprises conducting the reaction in the presence of silica gel, the amount of silica gel employed being in the range from about 70% to about 80% by weight of the $\alpha$-hydroxy nitrile charged to the reaction.

3. In a process for producing $\alpha$-acetoxypropionitrile by the reaction of $\alpha$-hydroxypropionitrile with acetic acid in the presence of an aromatic sulfonic acid and in an entrainer under reflux conditions, said entrainer being chosen from the group consisting of benzene, lower-alkyl-substituted benzenes, n-propyl acetate, and methyl n-propyl ketone, the improvement which comprises conducting the reaction in the presence of silica gel, the amount of silica gel employed being in the range from about 50% to about 100% by weight of the $\alpha$-hydroxy nitrile charged to the reaction.

4. In a process for producing $\alpha$-acetoxypropionitrile by the reaction of $\alpha$-hydroxypropionitrile with acetic acid in the presence of benzenesulfonic acid and in p-xylene under reflux conditions, the improvement which comprises conducting the reaction in the presence of an amount of silica gel in the range from about 70% to about 80% by weight of the $\alpha$-hydroxypropionitrile charged to the reactor.

References Cited in the file of this patent
UNITED STATES PATENTS

| | | |
|---|---|---|
| 2,155,625 | Von Retze | Apr. 25, 1939 |
| 2,396,292 | Slotterbeck | Mar. 12, 1946 |